United States Patent
Komiyama et al.

(10) Patent No.: US 6,662,096 B2
(45) Date of Patent: Dec. 9, 2003

(54) VEHICLE DRIVE SYSTEM AND VEHICLE CONTROLLING METHOD

(75) Inventors: Susumu Komiyama, Yokohama (JP); Yoshitaka Deguchi, Yokohama (JP); Musashi Yamaguchi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/073,880

(22) Filed: Feb. 14, 2002

(65) Prior Publication Data

US 2002/0123836 A1 Sep. 5, 2002

(30) Foreign Application Priority Data

Mar. 1, 2001 (JP) ........................................ 2001-056352

(51) Int. Cl.[7] ........................ B60K 41/00; B60K 41/18; F16H 61/12
(52) U.S. Cl. .......................... 701/54; 701/22; 180/65.2
(58) Field of Search ............................. 701/54, 22, 58, 701/51, 53, 55; 180/65.2, 65.3, 65.4, 65.8; 477/107, 115, 37, 156; 290/40 A, 40 B, 4 R, 40 C, 40 D, 40 F, 40 R, 46, 51, 14, 16; 318/139, 146

(56) References Cited

U.S. PATENT DOCUMENTS 5,264,764 A * 11/1993 Kuang .......................... 318/139
5,754,428 A * 5/1998 Ishikawa ................... 364/424.1
5,931,761 A * 8/1999 Tsutsui et al. ............... 477/118
6,201,312 B1 * 3/2001 Shioiri et al. .............. 290/40 C
6,281,646 B1 * 8/2001 Masberg et al. ............. 318/139
6,291,903 B1 * 9/2001 Horibe ....................... 290/40 A
6,324,456 B2 * 11/2001 Bosse ........................... 701/54
6,389,348 B1 * 5/2002 Takagi et al. ................. 701/58
6,432,024 B2 * 8/2002 Hattori et al. ................ 477/44
6,484,830 B1 * 11/2002 Gruenwald et al. ........ 180/65.2

FOREIGN PATENT DOCUMENTS

JP              11-82084           3/1999

* cited by examiner

Primary Examiner—Tan Q. Nguyen
Assistant Examiner—Dalena Tran
(74) Attorney, Agent, or Firm—Foley & Lardner

(57) ABSTRACT

A minimum needed power is computed by adding a reserve drive power to a target drive power, a best fuel cost-performance rotation speed is computed based on the target drive power and the best fuel cost-performance power characteristics of an engine (1), and a minimum needed rotation speed is computed based on the minimum needed power and the maximum power characteristics of the engine (1). The best fuel cost-performance rotation speed is compared with the minimum needed rotation speed, the larger is selected as a target input rotation speed of a continuously variable transmission (2), the speed ratio of the transmission (2) is controlled based on the driving axle rotation speed and target input rotation speed, and the torque of the engine (2) is controlled based on the engine rotation speed and target drive power.

24 Claims, 7 Drawing Sheets

VEHICLE DRIVE SYSTEM AND VEHICLE CONTROLLING METHOD

FIELD OF THE INVENTION

This invention relates to the vehicle control.

BACKGROUND OF THE INVENTION

JP-A-H11-82084 published by the Japanese Patent Office in 1999 discloses a vehicle drive system which adds a reserve drive power to a target drive power to calculate a minimum needed power, computes the engine rotation speed which can realize the minimum needed power with the best fuel cost-performance, and controls the speed ratio of a continuously variable transmission (CVT) so that the input rotation speed of the CVT becomes equal to the computed rotation speed.

SUMMARY OF THE INVENTION

In a vehicle comprising a CVT, as the drive point of the engine can be freely selected, fuel cost-performance can be improved by choosing a point with least fuel consumption among the drive points which generate a target drive power. On the other hand, when the drive point is close to a maximum torque line, torque cannot be generated immediately even if the accelerator pedal is depressed, and acceleration cannot be obtained unless the speed ratio of the CVT is moved to the low side (large speed ratio side) and the engine rotation speed is increased. Therefore the engine rotation speed is set high so that power can be increased immediately even if the CVT does not perform speed change when the accelerator pedal is depressed, and sufficient power must be reserved for acceleration (reserve drive power). Although this satisfies acceleration demand, conversely, in the steady state when there is no acceleration demand, the drive point shifts from the best fuel cost-performance point, and fuel cost-performance is impaired.

In order to solve this problem, with the above-mentioned conventional technique, the minimum needed power is computed by adding a reserve drive power according to the running condition to the target drive power, and the engine rotation speed is controlled to the rotation speed which generates this minimum needed power with the best fuel cost-performance. This realizes the required reserve drive power, and also prevents the drive point in the steady state without acceleration demand from shifting much from the best fuel cost-performance point.

However, in this method, the reserve drive power corresponds to the power from the actual drive point of the engine to the maximum needed torque. That is, a power corresponding to the difference from the best fuel cost-performance lane to the maximum torque line is obtained in reserve rather than the set reserve drive power, the drive point shifts by a corresponding amount to higher rotation speed, and fuel cost-performance is impaired.

It is therefore an object of this invention to suppress the drive point of an engine from shifting from the best fuel cost-performance line while maintaining a set reserve drive power.

In order to achieve above object, this invention provides a drive system for a vehicle, comprising an engine, a drive wheel, a continuously variable transmission provided between the engine and the drive wheel, a sensor which detects an accelerator depression amount, a sensor which detects a vehicle speed, a sensor which detects an engine rotation speed, and a controller functioning to compute a target drive power based on the accelerator depression amount and vehicle speed, set a reserve drive power for vehicle acceleration, compute a minimum needed power by adding the reserve drive power to the target drive power, compute a best fuel cost-performance rotation speed based on the target drive power and best fuel cost-performance power characteristics of the engine, compute a minimum needed rotation speed based on the minimum needed power and maximum power characteristics of the engine, compare the best fuel cost-performance rotation speed and minimum needed rotation speed, and select the larger as the target input rotation speed of the transmission, control the speed ratio of the transmission based on the vehicle speed and target input rotation speed, and control the torque of the engine based on the engine rotation speed and target drive power.

According to an aspect of this invention, this invention provides a vehicle drive system, comprising an engine, a drive wheel, a generator connected to the engine, a motor connected to the drive wheel, a battery electrically connected to the generator and the motor, a sensor which detects an accelerator depression amount, a sensor which detects a vehicle speed, a sensor which detects an engine rotation speed, a sensor which detects a motor rotation speed and a controller functioning to compute a target drive power based on the accelerator depression amount and vehicle speed, compute a required motor power by correcting the target drive power by the efficiency of the motor, set a target generated power according to the required motor power, compute a target engine power by correcting the target generated power by the efficiency of the generator, set a reserve drive power for vehicle acceleration, compute a minimum needed power by adding the reserve drive power to the target engine power, compute a best fuel cost-performance rotation speed based on the target engine power and best fuel cost-performance power characteristics of the engine, compute a minimum needed rotation speed based on the minimum needed power and maximum power characteristics of the engine, compare the best fuel cost-performance rotation speed and minimum needed rotation speed, and select the larger as the target rotation speed of the generator, control the torque of the motor based on the motor rotation speed and target drive power, control the rotation speed of the generator based on the target rotation speed, and control the torque of the engine based on the engine rotation speed and target engine power.

According to an another aspect of this invention, this invention provides a vehicle drive system, comprising an engine, a drive wheel, a continuously variable transmission provided between the engine and the drive wheel, a motor connected to either one of the engine and drive wheel, a battery electrically connected to the motor, a sensor which detects an accelerator depression amount, a sensor which detects a vehicle speed, a sensor which detects an engine rotation speed, and a controller functioning to compute a target drive power based on the accelerator depression amount and vehicle speed, set a target engine power according to the target drive power, set a reserve drive power for vehicle acceleration, compute a minimum needed power by subtracting an available discharge power of the battery from a value obtained by adding the reserve drive power to the target engine power, compute a best fuel cost-performance rotation speed based on the target engine power and the best fuel cost-performance power characteristics of the engine, compute a minimum needed rotation speed based on the minimum needed power and the maximum power characteristics of the engine, compare the best fuel cost-performance rotation speed and minimum needed rotation speed, and select the larger as the target input rotation speed of the transmission, compute the maximum power of the engine based on the engine rotation speed, compare the target engine power with the maximum engine power, and select the smaller as a final value of the target engine power, control the torque of the motor based on the target drive power and the final value of the target engine power, and control the torque of the engine based on the engine rotation speed and the final value of the target engine power.

The details as well as other features and advantages of this invention are set forth in the remainder of the specification and are shown in the accompanying drawings.

DESCRIPTION OF THE PREFERRED EMBODIMENTS

Figure 1:
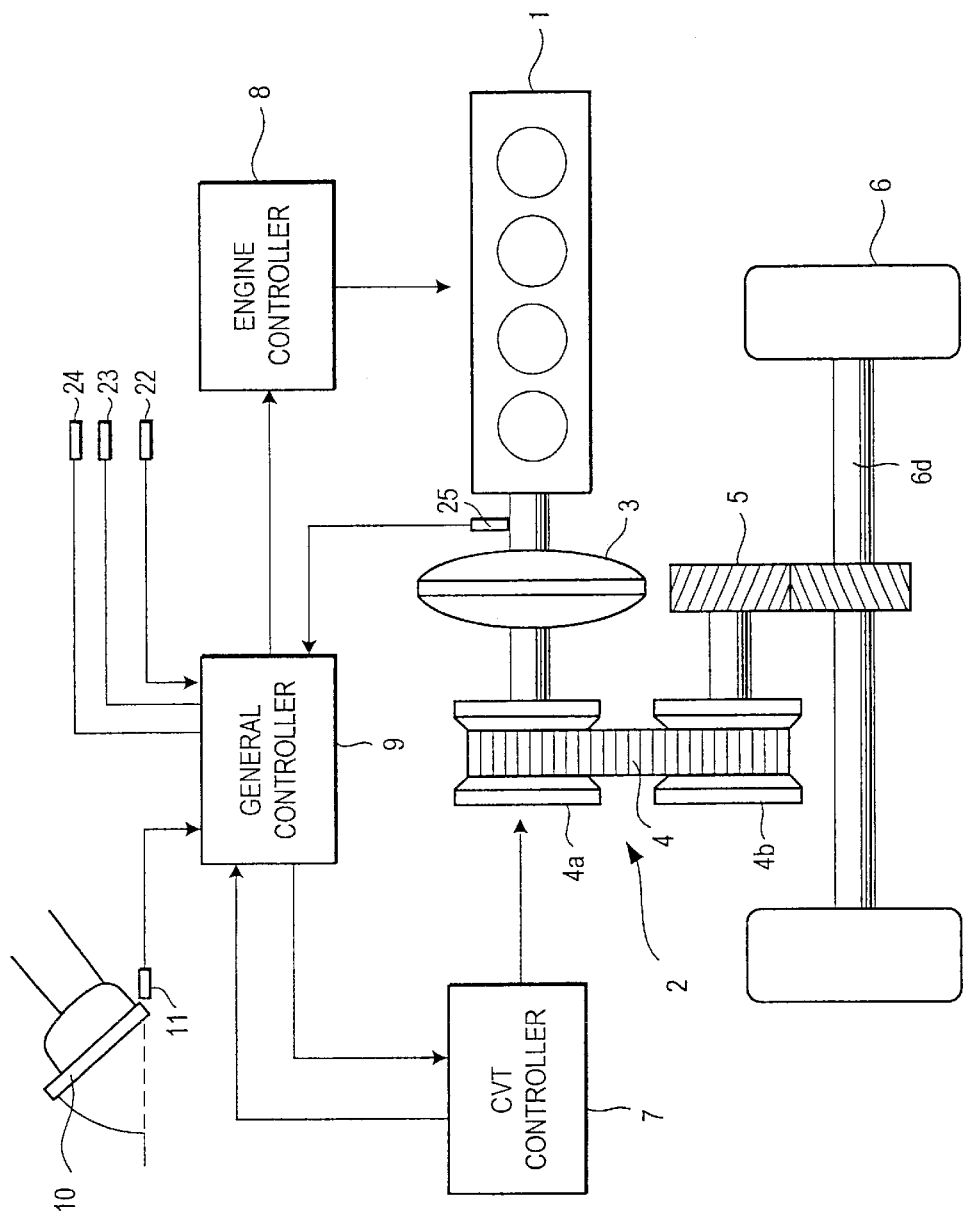
FIG. 1 is a schematic diagram of a vehicle relating to this invention.

Referring to FIG. 1 of the drawings, a vehicle is equipped with an in-line 4-cylinder engine 1 and a continuously variable transmission (CVT) 2. The torque generated by the engine 1 is transmitted to drive wheels 6 through the CVT 2, a final gear 5 and driving axles 6$d$.

The CVT 2 comprises a torque converter 3 and a metal belt 4 looped around pulleys 4$a$, 4$b$, and the speed ratio, which is the ratio of the output rotation to the input rotation, is varied by changing the pulley ratio of the pulleys 4$a$, 4$b$.

The speed ratio is controlled by a CVT controller 7. The CVT controller 7 adjusts a primary pressure and a secondary pressure for changing the width of grooves of pulleys 4$a$, 4$b$ by actuators so that the input rotation speed of the CVT 2 is equal to a target input rotation speed command value from a general controller 9, thereby controlling the speed ratio of the CVT 2. The CVT controller 7 computes a real speed ratio from the input rotation speed and output rotation speed of the CVT 2, and this value is sent to the general controller 9.

An engine controller 8 controls a throttle opening independently of an accelerator depression by the driver based on the engine torque command value from the general controller 9, and the torque generated by the engine 1 is thereby controlled. For example, if there is an acceleration demand due to the driver depressing an accelerator pedal 10, the engine torque command value increases corresponding to the increase of the accelerator depression amount and the engine controller 8 enlarges the throttle opening. The intake air amount introduced into the engine 1 at this time increases, and the fuel amount supplied from a fuel injector also increases, so the torque generated by the engine 1 becomes large and the acceleration demand is met.

An accelerator depression amount APS from an accelerator sensor 11, a vehicle speed VSP from a vehicle speed sensor 22 and an engine rotation speed Ner from an engine rotation speed sensor 25 are input to the general controller 9. Based thereon, the general controller 9 performs the following processing (1)–(5) to calculate two command values (target input rotation speed command value Npri and engine torque command value T), outputs the target input rotation speed command value Npri to the CVT controller 7, and outputs the engine torque command value T to the engine controller 8.

(1) A target drive power Pd is computed according to the drive condition for steady running, and a reserve drive power Pm is set in preparation for an acceleration demand. The value of both added together is computed as a minimum needed power Pn.

(2) A best fuel cost-performance rotation speed Ng is computed from the target drive power Pd by looking up the best fuel cost-performance power characteristics of the engine 1.

(3) A minimum needed rotation speed Nk is computed from a minimum needed power Pn by looking up the maximum power characteristics of the engine 1.

(4) Two rotation speeds Ng, Nk are compared, and the larger is selected as the target input rotation speed command value Npri of the CVT 2.

(5) The engine torque command value T is computed based on the target drive power Pd.

Figure 2:
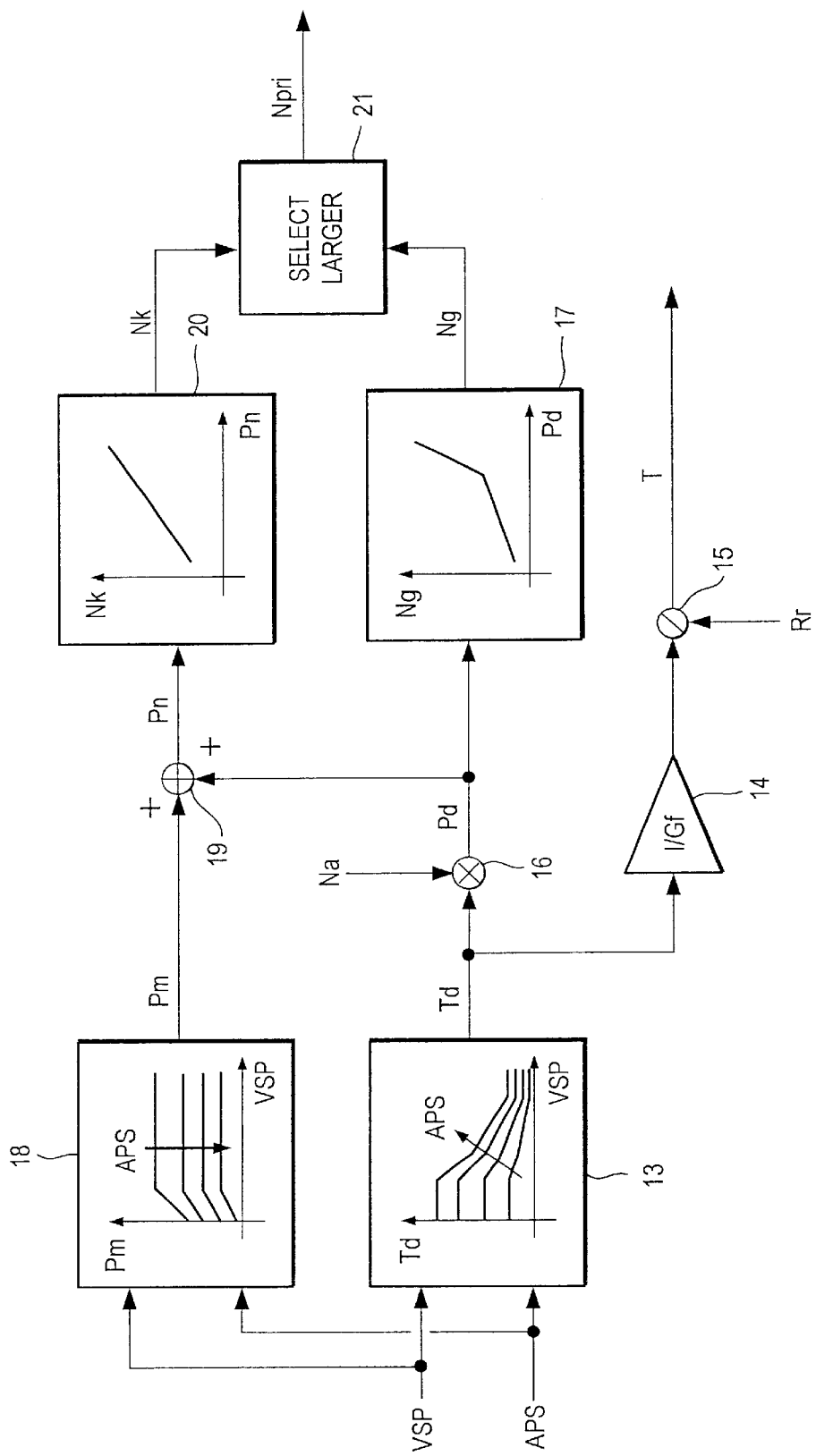
FIG. 2 is a control block diagram of a general controller.

The details of the control performed by the general controller 9 will be described based on FIG. 2. Although FIG. 2 shows a control block diagram, the control can also be represented by a flowchart. By activating all of the blocks together, the two above-mentioned command values Npri, T are computed at a predetermined interval, for example, 10 milliseconds.

A block 13 into which the accelerator depression amount APS [deg] from the accelerator sensor 11 and the vehicle speed VSP [km/h] from the vehicle speed sensor 22 are input, computes a target driving axle drive torque Td [Nm] by looking up a map which specifies the relation between vehicle speed, accelerator depression amount and drive torque.

By dividing the target driving axle drive torque Td, by a final gear ratio Gf of the final gear 5 and the real speed ratio Rr from the CVT controller 7, dividers 14, 15 compute the engine torque command value T [Nm] which is the torque command value of the engine shaft. The engine torque command value T is sent to the engine controller 8.

The computation of the engine torque command value T is not limited to this, and may be computed also by dividing the target drive power Pd by the real rotation speed Ner of the engine 1.

A multiplier 16 computes the target drive power Pd [W] by multiplying the target driving axle drive torque Td from the block 13 by a driving axle rotation speed Na which can be found from the vehicle speed VSP. A block 17 computes the best fuel cost-performance rotation speed Ng [rpm] by looking up a table specifying the relation between the target drive power and the best fuel cost-performance rotation speed from the target drive power Pd. The best fuel cost-performance rotation speed Ng is the rotation speed at which fuel cost-performance is optimized when the target drive power Pd is generated by the engine 1.

A block 18 computes the reserve drive power Pm [W] from the accelerator depression amount APS and vehicle speed VSP by looking up a map specifying the relation between vehicle speed, accelerator depression amount and reserve drive power. An adder 19 computes the minimum needed power Pn [W] by adding the target drive power Pd to the reserve drive power Pm.

A block 20 computes the minimum needed rotation speed Nk [rpm] from the minimum needed power Pn by looking up a table specifying the relation between the minimum needed power and the minimum needed rotation speed. The minimum needed rotation speed Nk is the minimum engine rotation speed when the minimum needed power Pn is generated by the engine 1 as the maximum power.

A block 21 compares the minimum needed rotation speed Nk with the best fuel cost-performance rotation speed Ng, and the larger is selected as a target input rotation speed command value Npri of the CVT 2. The target input rotation speed command value Npri is sent to the CVT controller 7.

Next, the effect of this embodiment will be described.

According to this embodiment, the torque of the engine 1 is controlled based on the target drive power Pd, and the sum of the target drive power Pd and the reserve drive power Pm is computed as the minimum needed power Pn.

The rotation speed at which the target drive power Pd is generated from the engine 1 with the best fuel cost-performance (the best fuel cost-performance rotation speed Ng), and the minimum rotation speed at which the minimum needed power Pn is generated as the maximum power from the engine 1 (the minimum needed rotation speed Nk), are respectively computed. These two rotation speeds Ng, Nk are compared, the larger is selected as the target input rotation speed Npri of the CVT 2, and the speed ratio of the CVT 2 is controlled based on this selected value.

In this embodiment, as the drive point of the engine 1 is determined as mentioned above, the reserve drive power can be obtained as it is set considering the power from the best fuel cost-performance line to the maximum torque line. Simultaneously, the shift of the drive point of the engine 1 from the best fuel cost-performance line is suppressed, and impairment of fuel cost-performance is reduced by a corresponding amount.

Figure 3B:
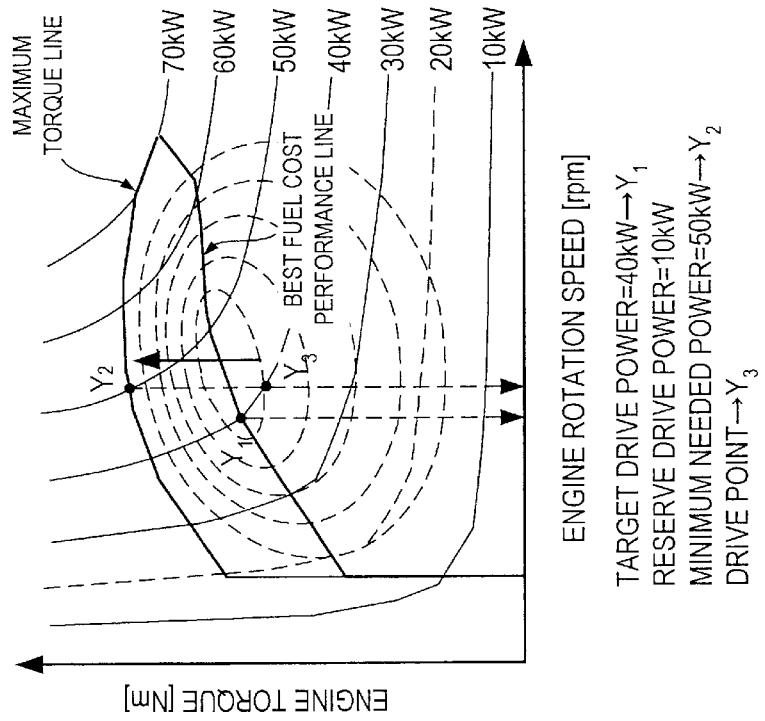
FIG. 3($a$) and FIG. 3($b$) are diagrams showing how the drive point of an engine is set.
Figure 3A:
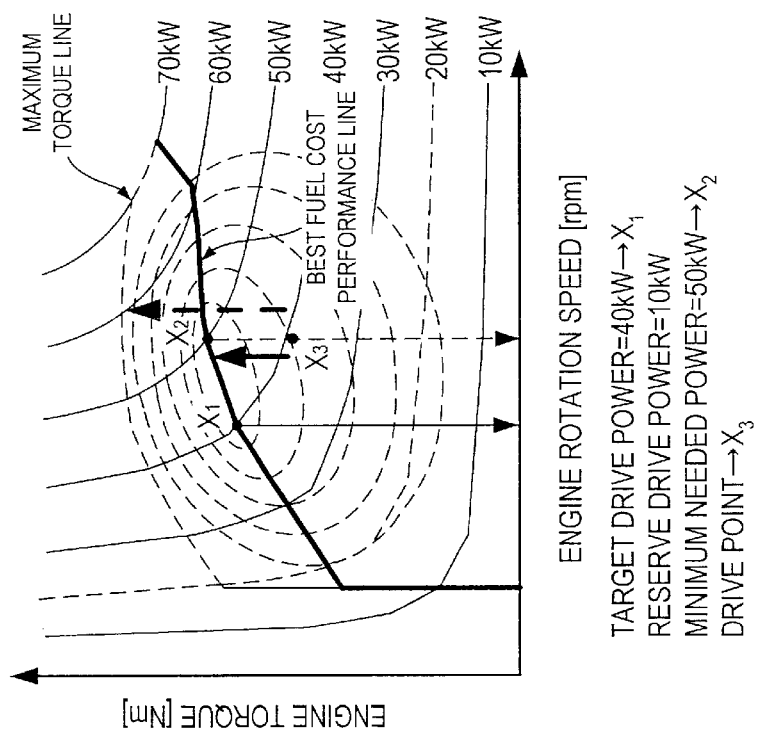

FIG. 3($a$) and FIG. 3($b$) show how the drive point of the engine is set. The left-hand side, FIG. 3($a$), shows the case where, using the value obtained by adding the reserve drive power to the target drive power as the minimum needed power, the engine rotation speed is controlled to the rotation speed at which this minimum needed power is generated with the best fuel cost-performance (hereafter, comparison example), and the right-hand side, FIG. 3($b$), is the case of this embodiment. For comparison purposes, the target drive power and reserve drive power are the same, i.e., 40 kW and 10 kW, in both cases. Therefore, the minimum needed power which is the sum of the two, is also the same in both cases, i.e., 50 kW. In the figure, $X_1$, $Y_1$ are the points where the target drive power of 40 kW is generated with the best fuel cost-performance.

In the comparison example of FIG. 3($a$), when the target drive power is set to 40 kW and the reserve drive power is set to 10 kW, the minimum needed power is 50 kW, and the engine rotation speed at which this minimum needed power of 50 kW can be realized is the rotation speed at a point $X_2$ of intersection between an equal output line of 50 kW and the best fuel cost-performance. To output the target drive power of 40 kW at the rotation speed of $X_2$, the drive point must be set to $X_3$, which is the point of intersection between a perpendicular dropped from $X_2$ which is on the best cost-performance line and the equal output line of 40 kW. At $X_3$, the reserve drive power which can actually be obtained is also equal to the power obtained by increasing the torque from the drive point of $X_3$ to the maximum torque line without changing the rotation speed (dotted arrow), i.e., 30 kW (=70 kW−40 kW). On the other hand, the reserve drive power which is set is the part from $X_3$ to $X_2$ (solid arrow), i.e., 10 kW, so 20 kW, which is the power corresponding to the distance from $X_2$ on the best fuel cost-performance line to the maximum torque line, is obtained in excess. The drive point $X_3$ is shifted from the best fuel cost-performance line corresponding to this, and impairs fuel cost-performance.

Conversely, in the embodiment shown in FIG. 3($b$), a minimum needed rotation speed Nk which is the minimum rotation speed required for the minimum needed power Pn to be generated from the engine 1 as the maximum power, is the rotation speed at a point $Y_2$ which is the point of intersection between the 50 kW equal output line and the maximum torque line. At the rotation speed of $Y_2$, the drive point which generates 40 kW is a point $Y_3$ which is the point of intersection between the perpendicular dropped from $Y_2$ and the 40 kW equal output line. It is seen that the reserve drive power Pm which can be obtained at this time is 10 kW (solid arrow), and that the reserve drive power Pm can be obtained as it is set.

The point $Y_3$ which is the drive point in this embodiment is on the lower rotation speed side than the point $X_3$ which is the drive point in the comparative example. Also, there is not much shift from the best cost fuel-performance line, and this embodiment therefore suppresses impairment of fuel cost-performance better than the comparative example.

Figure 4:
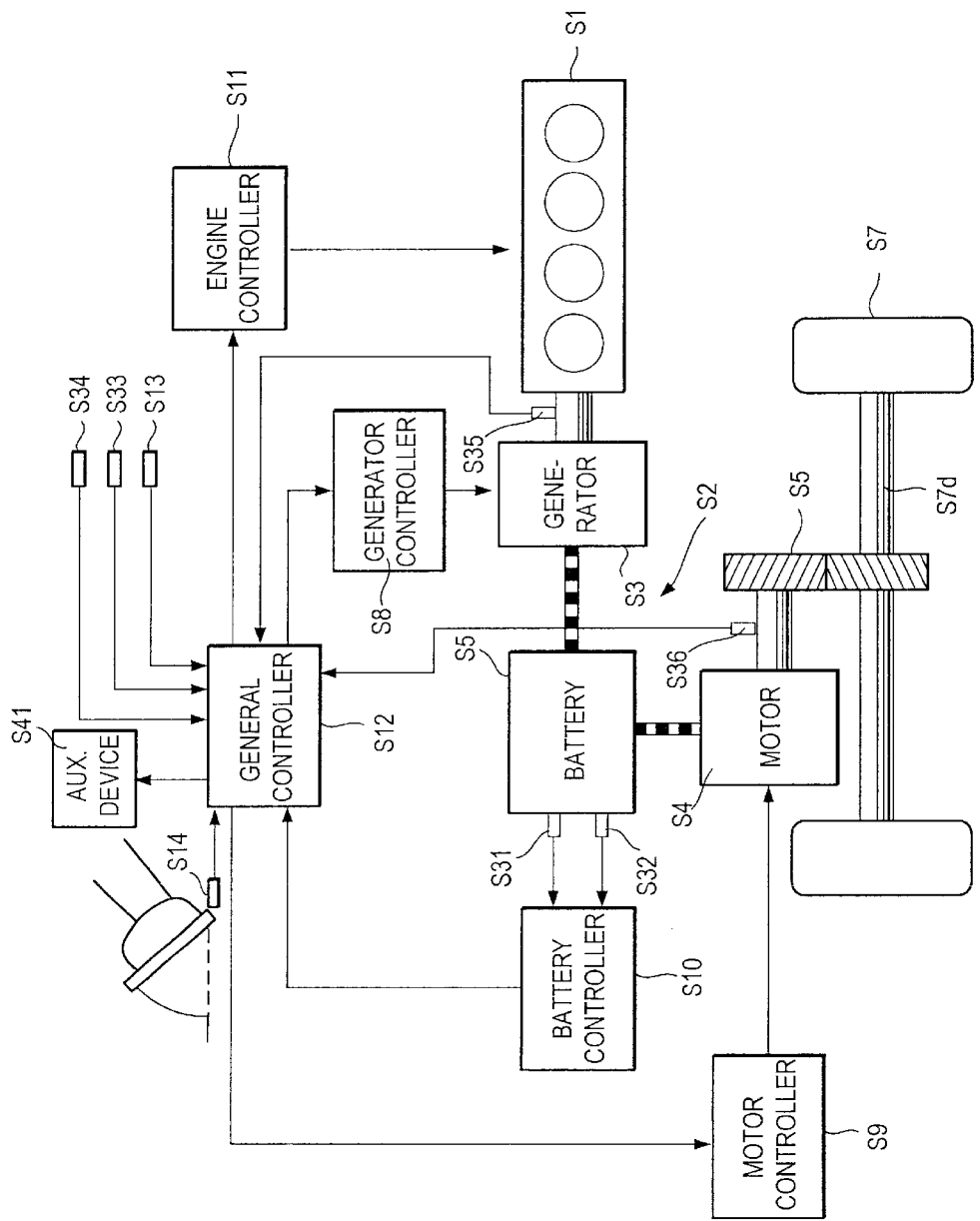
FIG. 4 is a schematic diagram of a vehicle according to a second embodiment.
Figure 5:
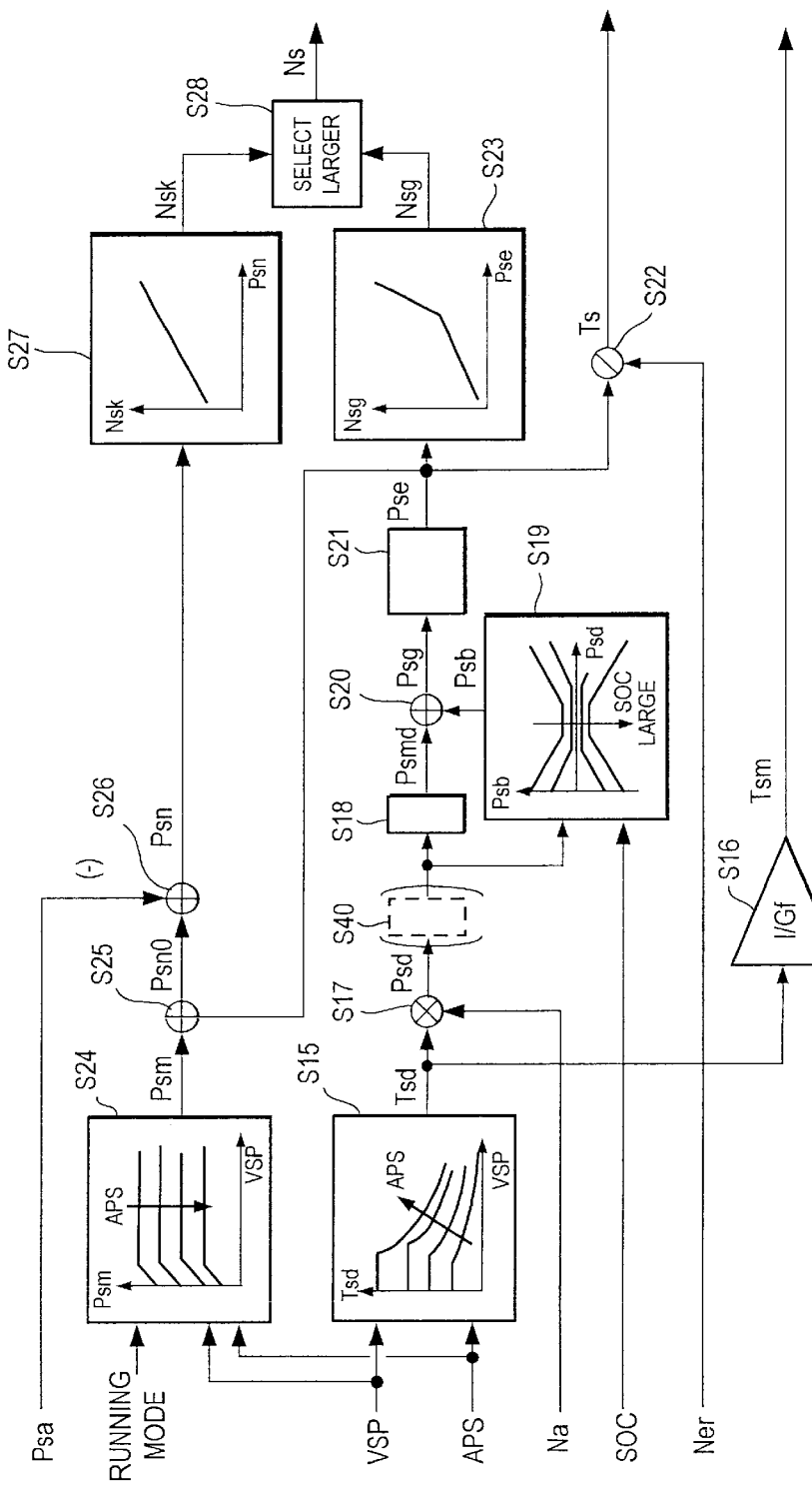
FIG. 5 is a control block diagram of a general controller according to the second embodiment.
Figure 6:
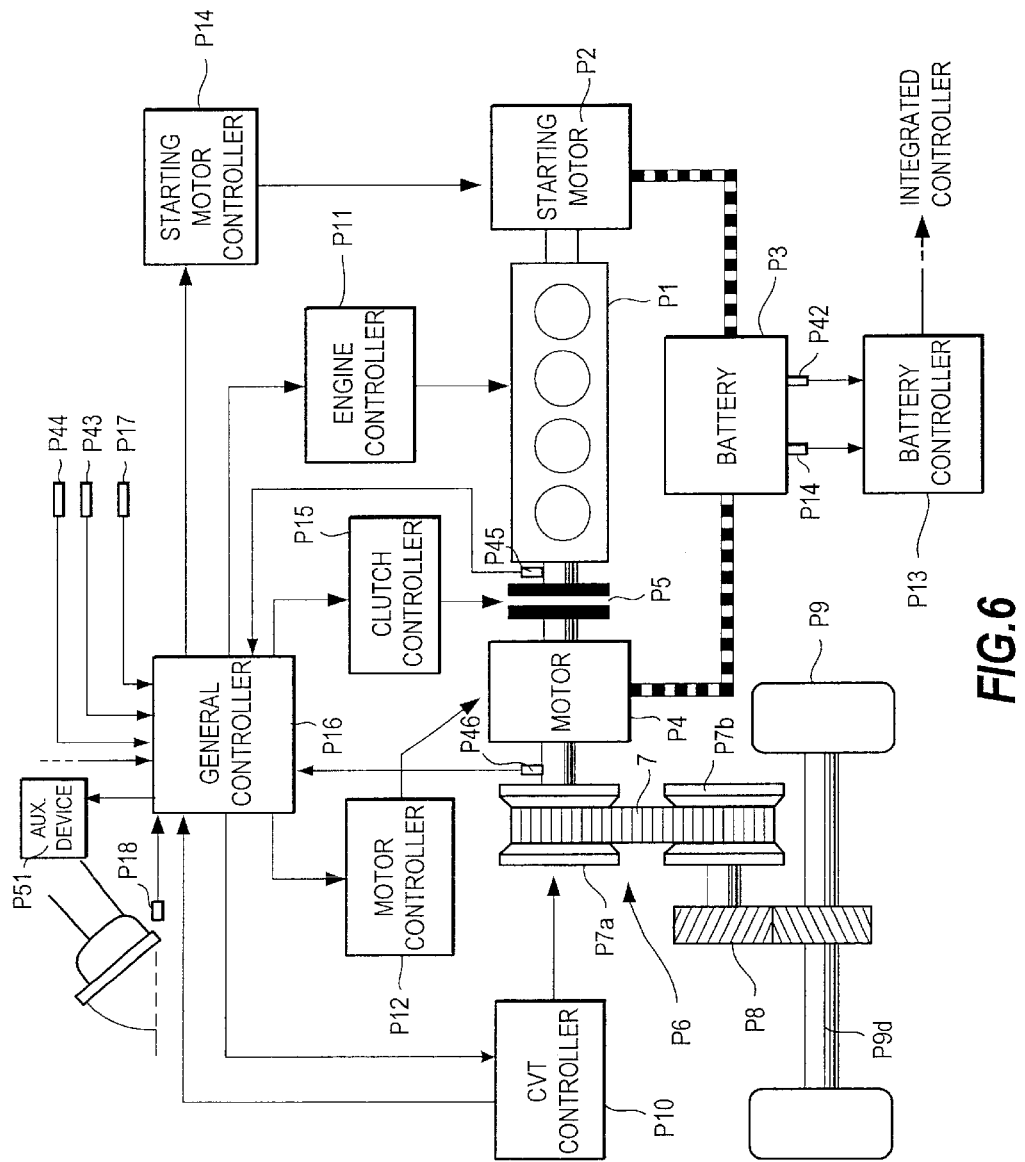
FIG. 6 is a schematic diagram of a vehicle according to a third embodiment.
Figure 7:
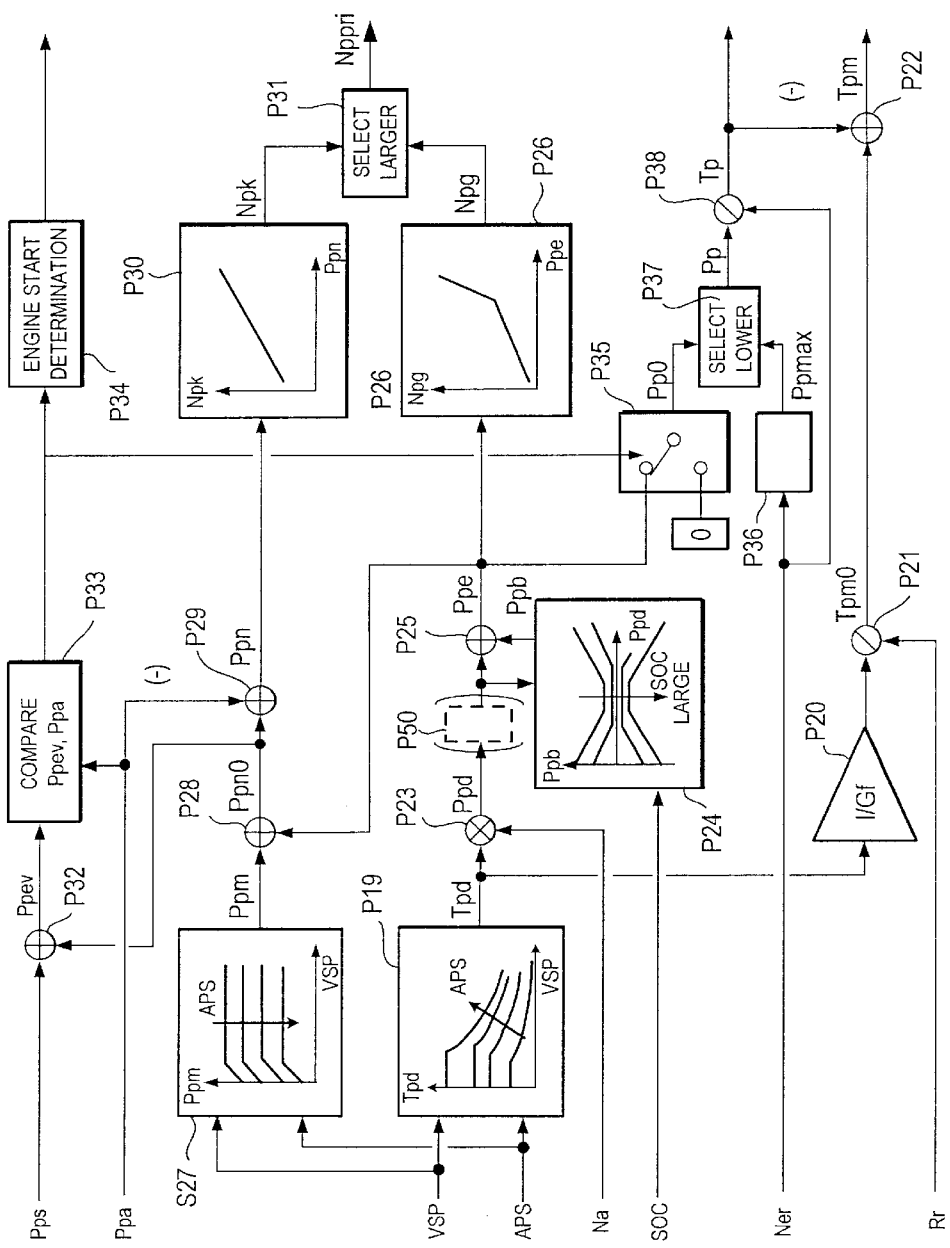
FIG. 7 is a control block diagram of a general controller according to the third embodiment.

Next, FIG. 4, FIG. 6 describe the vehicle construction when this invention is applied to a hybrid vehicle. FIG. 4 is a series hybrid vehicle (second embodiment), and FIG. 6 is a parallel hybrid vehicle (third embodiment). To distinguish between the two, reference numbers are preceded by an "S" in FIG. 4, and reference numbers are preceded by a "P" in FIG. 6. FIG. 5, FIG. 7 respectively show the processing performed by the general controller of the second and third embodiment. Here also, "S" or "P" are appended to reference numbers for the same reason. Further, in FIG. 5, FIG. 7, "s" or "p" is appended at the beginning of the subscript for each value.

First, FIG. 4 will be described. In this series hybrid vehicle, a generator S3 which is connected to an engine S1 and converts the power of the engine S1 into electricity, a motor S4 driven by the power generated by the generator S3, the power stored in a battery S5 or by both of these powers, and a CVT S2 are provided. The torque of the motor S4 is transmitted to drive wheels S7 via a final gear S6 and driving axles S7$d$.

A generator controller S8 and motor controller S9 are provided to control the generator S3 and motor S4. The generator controller S8 performs rotation speed control of the generator S3 so that the rotation speed of the engine S1 and generator S3 are equal to a rotation speed command value from a general controller S12. Specifically, in the rotation speed control, a torque command value is determined according to a difference between the command value and the real rotation speed, and vector control is performed so that the torque becomes the command value. At this time, the generator S3 also generates power by absorbing engine torque.

The motor controller S9 vector controls the torque of the motor S4 based on a motor torque command value from the general controller S12.

A battery controller S10 is provided so that the state of the battery S5 may be known. The battery controller S10 detects the voltage and current of the battery S5 using sensors S31, S32, computes an SOC (State of Charge) which represents the charge state of the battery S5 and an available discharge power Psa, and sends the result to the general controller S12.

In the general controller S12 to which signals are input from a vehicle speed sensor S13, accelerator sensor S14, engine rotation speed sensor S35 and motor rotation speed sensor S36, the following processing (11)–(16) is performed based thereon, and three command values (generator rotation speed command value Ns, engine torque command value Ts, motor torque command value Tsm) are calculated. The generator rotation speed command value Ns is output to the generator controller S8, the engine torque command value Ts is output to the engine controller S11 and the motor torque command value Tsm is output to the motor controller S9, respectively.

(11) A target driving axle drive torque Tsd is computed according to the running condition, and the motor torque command value Tsm is computed based on this value.

(12) A target drive power Psd is computed from the target driving axle drive torque Tsd and driving axle rotation speed, a target engine power Pse is computed based on this target drive power Psd, and the value obtained by adding a reserve drive power Psm to this is computed as a minimum needed power Psn. When the target engine power Pse computed, the target charge and discharge power Psb of the battery S5 is added.

(13) A best fuel cost-performance rotation speed Nsg is computed from the target engine power Pse by looking up the best fuel cost-performance power characteristics of the engine S1.

(14) A minimum needed rotation speed Nsk is computed from the minimum needed power Psn by looking up the maximum power characteristics of the engine S1.

(15) By comparing the two rotation speeds Nsg, Nsk, the larger is selected as the generator rotation speed command value Ns.

(16) The engine torque command value Ts is computed from the target engine power Pse and real engine rotation speed Ner.

The details of the control performed by the general controller S12 will be described referring to FIG. 5. FIG. 5 is a control block diagram, but the control details may also be represented by a flowchart. By activating all blocks together, the above three command values Ns, Ts, Tsm are computed at a predetermined interval (e.g., 10 milliseconds).

A block S15 into which the accelerator depression amount APS from the accelerator sensor S14 and the vehicle speed VSP from the vehicle speed sensor S13 are input, computes the target driving axle drive torque Tsd [Nm] from these values by looking up a driving axle drive torque map.

A divider S16 computes the motor torque command value Tsm [Nm] which is the torque command value for the motor shaft by dividing the target driving axle drive torque Tsd by the final gear ratio Gf of the final gear S6. The motor torque command value Tsm is sent to the motor controller S9. A value obtained by dividing the target drive power Psd by the rotation speed of the motor S4 may also be calculated as the motor torque command value Tsm.

A multiplier S17 computes the target drive power Psd [W] by multiplying the target driving axle drive torque Tsd by the driving axle rotation speed calculated from the vehicle speed VSP.

A block S18 estimates the losses occurring in the motor S4, computes a required motor power Psmd [W] by adding this estimated value to the target drive power Psd. To estimate the losses in the motor S4, a motor loss map is first prepared by measuring the losses at each torque and rotation speed, and the losses are calculated from the motor torque command value Tsm and the real rotation speed of the motor S4 by looking up this map.

A block S19 computes a target charge and discharge power Psb [W] of the battery S5 from the target drive power Psd and SOC by looking up a charge and discharge power map. An adder S20 computes a target generated power Psg [W] by adding Psb to the required motor power Psmd. The addition of the target charge and discharge power Psb is performed to make the SOC of the battery S5 approach a predetermined value (e.g., 50%).

The target charge and discharge power Psb may also be calculated according to the available discharge power Psa computed by the battery controller S10 instead of the SOC. Further, the block S19 may be omitted, and the required motor power Psmd may be set as the target generated power Psg without modification.

A block S21 estimates the losses occurring when power is generated by the generator S3, and computes the target engine power Pse [W] by adding this estimated value to the target generated power Psg. To estimate the losses in the generator S3, a generator loss map is first prepared by measuring the losses at each generated power and rotation speed, and the losses are calculated from the target generated power Psg and the real rotation speed of the generator S3 by looking up this map.

A divider S22 computes the engine torque command value Ts [Nm] by dividing the target engine power Pse by the real engine rotation speed Ner. The engine torque command value Ts is sent to the engine controller S11. The generator rotation speed command value Ns described hereafter may also be used instead of the real engine rotation speed Ner.

A block S23 computes the best fuel cost-performance rotation speed Nsg from the target engine power Pse by looking up a table specifying the relation between the engine power and the best fuel cost-performance rotation speed. The best fuel cost-performance rotation speed Nsg is the rotation speed which gives optimum fuel cost-performance at the drive point of the engine S1 which generates the target engine power Pse. The best fuel cost-performance line in the table is set taking account of the losses in the generator S3.

A block S24 computes the reserve drive power Psm [W] from the accelerator depression amount APS and vehicle speed VSP by looking up a reserve drive power map.

An adder S25 computes a minimum needed power Psn0 [W] by adding the reserve drive power Psm to the target engine power Pse. An adder S26 computes a final value Psn [W] of the minimum needed power by inputting the minimum needed power Psn0 and one of the following values as a negative value. Specifically, the adder S26 effectively functions as a subtracter, and computes a value obtained by subtracting one of the following values from the minimum needed power Psn0, as the final value Psn of the minimum needed power.

(1) The available discharge power Psa of the battery S5 computed by the battery controller S10.

(2) The computed maximum power of the motor S4.

(3) The smaller of these two.

Here, as the method of computing the maximum power, the product of the maximum torque determined for each rotation speed of the motor S4 and its rotation speed may be used, or the value obtained by adding the losses to this product may be used. Also, instead of using the available discharge power Psa in (1), a value obtained by limiting the available discharge power according to the SOC may be used. The adder S26 can also be omitted.

A block S27 computes the minimum needed rotation speed Nsk from the minimum needed power final value Psn by looking up a table specifying the relation between the minimum needed power and minimum needed rotation speed. The minimum needed rotation speed Nsk is the minimum rotation speed at which the minimum needed power final value Psn can be generated by the engine S1.

A block S28 compares the minimum needed rotation speed Nsk with the best fuel cost-performance rotation speed Nsg, and selects the larger as the generator rotation speed command value Ns. The generator rotation speed command value Ns is sent to the generator controller S8.

Next, the parallel hybrid vehicle shown in FIG. 6 will be described.

in His parallel hybrid vehicle, the constriction is slightly more complex than in the series hybrid vehicle. Specifically, the parallel hybrid vehicle comprises a starting motor P2 connected to an engine P1 which has a generator function for converting the power of the engine P1 to electricity, a battery P3 which supplies power to the starting motor P2 when the engine starts and stores power generated by the starting motor P2 as a generator, a motor P4 which drives the vehicle by the power of the battery P3 and supplies power to the battery P3 by regenerating the kinetic energy of the vehicle when it is decelerating, a clutch P5 which engages or disengages the engine P1 and motor P4, and the CVT P6.

The CVT P6 comprises pulleys P7a, P7b and a metal belt P7. The torque of the engine P1 and motor P4 is input to the input shaft of the CVT P6, and transmitted from the output shaft to drive wheels P9 via a final gear P8 and driving axles P9d.

A CVT controller P10 controls a speed ratio by adjusting a primary pressure and a secondary pressure with an oil pressure actuator so that a target input rotation speed command value from a general controller P16 and an input rotation speed of the CVT P6 are equal. Further, the CVT controller P10 computes a real speed ratio from the input rotation speed and output rotation speed of the CVT P6, and sends the result to the general controller P16. The engine controller 11 controls the torque by controlling the throttle opening based on the engine torque command value from the general controller 16. The operation of the CVT controller P10 and engine controller P14 is identical to that of FIG. 1.

The motor controller P12 controls the torque of the motor P4 based on the torque command value from the general controller P16, and the battery controller P13 computes the SOC and available discharge power Psa based on the voltage and current of the battery P3 detected by sensors P41, P42. This result is sent to the general controller P16. The operation of the motor controller P12 and battery controller P13 is identical to the case of FIG. 4.

A starting motor controller P14 controls the torque of the starting motor P2 based on the torque command value from the general controller P16. For example, if the vehicle stops temporarily and the engine P1 automatically stops, the starting motor 1 drives the engine P1 by driving the starting motor P2 and restarts the engine P1 automatically when the vehicle is subsequently started.

A clutch controller P15 controls engaging and disengaging of the clutch P5 based on a clutch engaging command from the general controller P16. For example, when the vehicle is running at very low speed and the efficiency of the engine P1 is very poor, the clutch P5 is disengaged and the vehicle is run only under the motor P4. During deceleration, the clutch P5 is disengaged and the motor P4 is operated as a generator to recover energy. Also, during full acceleration, the clutch P5 is engaged and the vehicle is run under both the engine P1 and the motor P4.

In the figure, the motor P4 is situated on the input side of the CVT P6, but the motor P4 may also be situated on the output side of the CVT P6. In this case, the clutch PS is situated between the motor P4 and the CVT P6.

In the general controller P16 into which signals are input from a vehicle speed sensor P17, an accelerator sensor P18, an engine rotation speed sensor P45 and a motor rotation speed sensor P46, the following processing (21)–(26) is performed based on these signals, and three command values (the target input rotation speed command value Nppri, engine torque command value Tp, motor torque command value Tpm) are calculated. The target input rotation speed command value Nppri is output to the CVT controller P10, the engine torque command value Tp is output to the engine controller P14 and the motor torque command value Tpm is output to the motor controller P12.

(21) The target driving axle drive torque Td is computed according to the running condition, and a drive torque command value Tpm0 is computed based on this value. To distribute this value between the engine P1 and the motor P4, a value obtained by subtracting an engine torque command value Tp described hereafter from this drive torque command value Tpm0 is computed as the motor torque command value Tpm.

(22) A target drive power Ppd is computed from the target driving axle drive torque Tpd and driving axle rotation speed, a target engine power Ppe is computed based on this target drive power Ppd, and a value obtained by adding the reserve drive power Ppm to Ppe is computed as the minimum needed power Ppn. When the target engine power Ppe is computed, a target charge and discharge power Ppb of the battery P3 is taken into account.

(23) The best fuel cost-performance rotation speed Npg is computed from the target engine power Ppe by looking up the best fuel cost-performance power characteristics of the engine P1.

(24) The minimum needed rotation speed Npk is computed from the above minimum needed power Ppn by looking up the maximum power characteristics of the engine P1.

(25) The two rotation speeds Npg, Npk are compared, and the larger is selected as the target input rotation speed command value Ns of the CVT P6.

(26) The engine torque command value Tp is computed from the target engine power Ppe and the real engine rotation speed Ner.

The details of this control performed by the general controller P16 will be described referring to FIG. 7. FIG. 7 is a control block diagram, but the control may also be represented by a flowchart. By activating all the blocks together, the three command values Nppri, Tp, Tpm may be computed at a predetermined interval (e.g., 10 milliseconds).

In FIG. 7, the processing performed by each block is mostly identical to that of the series hybrid vehicle shown in FIG. 5, but differs from the series hybrid vehicle in the following two points.

P22 divides the torque between the engine P1 and the motor P4.

P32–P37 take account of engine stops.

When the clutch P5 is engaged and the vehicle is driven only under the engine P1 without using the motor P4 and starting motor P2, the control blocks shown in FIG. 2 may be applied without modification.

In FIG. 7, a block P19 into which the accelerator depression amount APS from the accelerator sensor P18 and the vehicle speed VSP from the vehicle speed sensor P17 are input, computes the target driving axle drive torque Tpd [Nm] from these values by looking up a driving axle drive torque map.

Dividers P20, P21 compute the drive torque command value Tpm0 [Nm] for the engine and the motor shaft by dividing the target driving axle drive torque Tpd by the final gear ratio Gf of the final gear P8, and the real speed ratio Rr from the CVT controller P10. This value is a value for the engine P1 and motor P4 overall, and is distributed between the engine PL and motor P4.

A multiplier P23 computes the target drive power Ppd [W] by multiplying the target driving axle drive torque Ppd, by the driving axle rotation speed Na calculated from the vehicle speed VSP.

A block P24 computes a target charge and discharge power Ppb [W] of the battery P3 from the target drive power Ppd and the SOC by looking up a charge and discharge power map, and an adder P25 computes the target engine power Ppe [W] which is the output command value of the engine P1 by adding the target charge and discharge power Ppb and the target drive power Ppd.

The target charge and discharge power Ppb may also be calculated according to the available discharge power Ppa computed by the battery controller P13 instead of the SOC. The block P24 may also be omitted, and the target drive power Ppd may be set as the target engine power Ppe without modification.

A block P26 computes the best fuel cost-performance rotation speed Npg from the target engine power Ppe by looking up a table specifying a relation between the engine power and the best fuel cost-performance rotation speed. The best fuel cost-performance rotation speed Npg is the rotation speed at which the cost-performance is optimized at the drive point of the engine P1 when the target engine power Ppe is output.

A block P27 computes the reserve drive power Ppm from the accelerator depression amount APS and vehicle speed VSP, by looking up a map specifying the relation between the vehicle speed, accelerator depression amount and reserve drive power, and an adder P28 computes the minimum needed power Ppn0 by adding the reserve drive power Ppm and the target engine power Ppe. An adder P29 computes the final value Ppn of the minimum needed power by subtracting the available discharge power Ppa from the minimum needed power Ppn0.

A block P30 computes the minimum needed rotation speed Npk from the minimum needed power final value Ppn by looking up a table specifying the relation between the minimum needed power and minimum needed rotation speed. The minimum needed rotation speed Npk is the minimum rotation speed at which the minimum needed power Ppn can be generated by the engine P1.

A block P31 compares the best fuel cost-performance rotation speed Npg with the minimum needed rotation speed Npk, and selects the larger as the target input rotation speed command value Nppri of the CVT P6. The target input rotation speed command value Nppri is sent to the CVT controller P10.

Next, an adder P32 computes a power Ppev required to run only under the motor by adding an engine start power Pps [W] supplied to the starting motor P2 when the engine is started and the minimum needed power Ppn0. A block P33 compares this power Ppev required to run only under the motor with the available discharge power Ppa computed by the battery controller P13.

When the power Ppev required to run only under the motor is larger than the available discharge power Ppa, an engine stop prohibition determination (idle stop prohibition determination) is output so that the power of the battery P3 is not consumed beyond the available discharge power Ppa. This is due to the fact that, in the general controller P16, when the vehicle stops for example to improve fuel cost-performance and an idle stop is commanded to the engine controller P11, operation of the engine P1 stops, but the power of the battery P3 is consumed to perform cranking of the engine P1 when the vehicle restarts. Hence, when the power Ppev required to run only under the motor is larger than the available discharge power Ppa, idle stop is prohibited and power consumption of the battery P3 is avoided.

On the other hand, when the available discharge power Ppa is larger than the power Ppev required to run only under the motor, there is no need to prohibit idle stop, and an engine stop prohibition determination is not output.

Instead of the available discharge power Ppa which is compared with the power Ppev required to run only under the motor, a value obtained by limiting the available discharge power according to the SOC computed by the battery controller P13 may be used. The engine start power Pps may be computed for example by looking up a table from the engine water temperature.

A block P34 determines whether the engine P1 has started when the engine stop prohibition determination is output. If the engine P1 stops, the block P34 outputs a torque command value to the starting motor controller P14 to start the engine P1, and outputs a fuel injection command and an ignition command to the engine controller P11. At this time, the starting motor controller P14 starts the motoring of the engine P1 by controlling the torque of the starting motor P2, and the engine controller P11 starts the fuel injection by fuel injection valves and spark ignition by ignition plugs. As a result, the engine P1 starts.

When an engine stop prohibition determination is output by the block P33 (when idle stop is prohibited), a block 35 outputs the target engine power Ppe as the target engine power Pp0 [W]. When an engine stop prohibition determination is not output by the block P33 (when an idle stop is not prohibited) and the conditions for permitting idle stop are satisfied, the target engine power Pp0=0 is output.

A block P36 computes a maximum power Ppmax [W] of the engine P1 at the present engine rotation speed based on the real engine rotation speed Ner, a block P37 compares the maximum power Ppmax and target engine power Pp0, and the smaller is selected as a final value Pp of the target engine power. This is due to the fact that, when the target engine power Ppe exceeds the maximum power Ppmax, a power exceeding the maximum power Ppmax cannot be generated even if the target engine power Ppe is taken as the target engine power final value Pp.

A divider P38 computes the engine torque command value Tp [Nm] by dividing the target engine power final value Pp by the real engine rotation speed Ner. The engine torque command value Tp is sent to the engine controller P11.

The adder P22 computes the motor torque command value Tpm by subtracting the engine torque command value Tp from the drive torque command value Tpm0 from the divider P21. The motor torque command value Tpm is sent to the motor controller P12.

The motor torque command value Tpm may be calculated also by dividing the power obtained by subtracting the target engine power final value Pp from the target drive power Ppd, by the rotation speed of the motor P4.

In the adder P22, instead of the engine torque command value Tp, an engine torque estimated value which takes account of the response delay when the engine P1 is in a transient state may be used. At this time, the drive torque command value Tpm0 is distributed between the engine torque and motor torque so that the response delay of the engine torque can be compensated by the motor P4 which has a good response. Further, when there are plural motors P4, the motor torque command value is distributed so that losses are minimized when it is output by the plural motors.

Due to this construction, in the case of the series hybrid vehicle shown in FIG. 4, FIG. 5 and parallel hybrid vehicle shown in FIG. 6, FIG. 7, an identical effect is obtained to that of the case of an ordinary vehicle shown in FIG. 1, FIG. 2. Also, when the target generated power Psg is computed in a series hybrid vehicle, and when the target engine power Ppe is computed in a parallel hybrid vehicle, the target charge and discharge powers Psb, Ppb are respectively considered, so the state of charge of the battery can be adjusted, and consequently the battery can be protected.

When the minimum needed power is computed, the available discharge power Psa, Ppa of the battery is subtracted, so the minimum needed power is further suppressed.

In FIG. 7, when the power Ppev required to run only under the motor and the available discharge power Ppa of the battery P3 are compared, and the power Ppev required to run only under the motor is smaller than the available discharge power Ppa, the target engine power final value Pp is set to zero without prohibiting engine stop (idle stop), engine stop is performed as far as possible, and fuel cost-performance is consequently improved.

Further, in FIG. 7, when the power Ppev required to run only under the motor and the available discharge power Ppa of the battery P3 are compared, and the power Ppev required to run only under the motor is larger than the available discharge power Ppa, engine stop (idle stop) is prohibited, and when the engine has actually stopped in this case, the engine start power is supplied to the starting motor P2 to start the engine P1. Hence, the set reserve drive power can be obtained regardless of the state of the battery P3 even when the vehicle is running only under the motor P4.

In FIG. 5, a block S40 may be provided between the multiplier S17 and block S18 which computes the power consumption of auxiliary devices S41 of the vehicle, and adds it to the target drive power Psd. The method of computing the power consumption of the auxiliary devices S41 may be (1) direct detection of power consumption by the auxiliary devices S41, (2) computation by subtracting the power of the motor S4 and generator S3 from the input and output power of the battery S5, and (3) use of a fixed value such as the average power consumption or a maximum rated power.

In FIG. 7, a block P50 which computes the power consumption of the auxiliary devices P51 of the vehicle and adds it to the target drive power Ppd may be placed immediately after the multiplier P23.

The block 18 of FIG. 2, block S26 of FIG. 5 and block P28 of FIG. 7 which compute the reserve drive power may have the following constructions regardless of the embodiment.

(1) Plural reserve drive power maps and running mode switches 23, S33, P43 which can be changed over by the driver are prepared, and the reserve drive power map is changed over according to a signal from the running mode switch. The reserve drive power Pm, Psm, Ppm is then computed from the accelerator depression amount APS and vehicle speed VSP by looking up the selected reserve drive power map.

For example, a reserve drive power map for ordinary running and a reserve drive power map for acceleration which has a larger reserve drive power than for ordinary running even at the same accelerator depression amount and vehicle speed, are prepared. When it is desired to emphasize acceleration, and the driver presses the running mode switch to change over from OFF to ON, the reserve drive power map is changed over from the map for ordinary running to the map for acceleration. In this way, acceleration characteristics according to the driver's intention can be obtained.

(2) Plural reserve drive power maps and road gradient sensors 24, S34, P44 are prepared, and the map which suits the road gradient at that time is selected based on a gradient signal from the road gradient sensors. The reserve drive power Pm, Psm, Psm is then computed from the accelerator depression amount APS and vehicle speed VSP by looking up the selected reserve drive power map. In this way, acceleration characteristics according to the road gradient can be obtained. The gradient sensors 24, S34, P44 may for example be gyro sensors. The road gradient may also be computed using information from a navigation system.

In addition to the embodiments described above, this invention may be applied also to a vehicle having a conventional transmission which has finite gear positions instead of the CVT 2 or P6, and to a four-wheel drive hybrid vehicle wherein the motive force of the motor is transmitted to one of the front and rear wheels, and the motive force of the engine is transmitted to the other wheels via a CVT or a conventional transmission, in the construction of FIG. 1, FIG. 6. When a conventional transmission is used, the drive point of the engine cannot be selected freely as in the case when a CVT is used, but from the viewpoint of improving fuel cost-performance, the gear position which gives the best fuel cost-performance among the drive points for the gear positions which output the target drive power Pd and target engine power Ppe, and the lowest gear position which gives the minimum needed power Pn, Ppn found by adding the reserve drive power respectively to the target drive power Pd or target engine power Ppe as the maximum power, are found, and the lower gear position of the two is selected.

Further, this invention may be applied also to a four-wheel drive hybrid vehicle wherein motors are provided for the front or rear wheels, or motors are provided for each of the four wheels. In this case, the torque is distributed according to the difference of the rotation speeds of the wheels.

The entire contents of Japanese Patent Application P2001-56352 (filed Mar. 1, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A drive system for a vehicle, comprising:
an engine,
a drive wheel,
a continuously variable transmission provided between the engine and the drive wheel,
a sensor which detects an accelerator depression amount,
a sensor which detects a vehicle speed,
a sensor which detects an engine rotation speed, and
a controller functioning to:

compute a target drive power based on the accelerator depression amount and vehicle speed, set a reserve drive power in preparation for an acceleration demand, compute a minimum needed power by adding the reserve drive power to the target drive power, compute a best fuel cost-performance rotation speed based on the target drive power and best fuel cost-performance power characteristics of the engine, compute a minimum needed rotation speed based on the minimum needed power and maximum power characteristics of the engine, compare the best fuel cost-performance rotation speed and minimum needed rotation speed, and select the larger as the target input rotation speed of the transmission, control the speed ratio of the transmission based on the vehicle speed and target input rotation speed, and control the torque of the engine based on the engine rotation speed and target drive power.

2. The drive system as defined in claim 1, wherein the controller further functions to:

store a relation between the engine power and the best fuel cost-performance rotation speed of the engine, and compute the best fuel cost-performance rotation speed based on the target drive power and the stored relation.

3. The drive system as defined in claim 1, wherein the controller further functions to:

store a relation between the engine rotation speed and the maximum power of the engine, and compute the minimum needed rotation speed based on the minimum needed power and the stored relation.

4. The drive system as defined in claim 1, wherein:

the transmission comprises a generator connected to the engine and a motor connected to the drive wheel, and the controller further functions to:

control the torque of the motor based on the motor rotation speed and target drive power, and control the rotation speed of the generator based on the target input rotation speed.

5. The drive system as defined in claim 1, wherein the controller further functions to:

determine a running mode of the vehicle, and modify the reserve drive power according to the running mode.

6. The drive system as defined in claim 1, wherein the controller further functions to:

determine a gradient of a road, and modify the reserve drive power according to the gradient.

7. A drive system for a vehicle, comprising:

an engine, a drive wheel, a generator connected to the engine, a motor connected to the drive wheel, a battery electrically connected to the generator and the motor, a sensor which detects an accelerator depression amount, a sensor which detects a vehicle speed, a sensor which detects an engine rotation speed, a sensor which detects a motor rotation speed and a controller functioning to:

compute a target drive power based on the accelerator depression amount and vehicle speed, compute a required motor power by correcting the target drive power by the efficiency of the motor, set a target generated power according to the required motor power, compute a target engine power by correcting the target generated power by the efficiency of the generator, set a reserve drive power in preparation for an acceleration demand, compute a minimum needed power by adding the reserve drive power to the target engine power, compute a best fuel cost-performance rotation speed based on the target engine power and best fuel cost-performance power characteristics of the engine, compute a minimum needed rotation speed based on the minimum needed power and maximum power characteristics of the engine, compare the best fuel cost-performance rotation speed and minimum needed rotation speed, and select the larger as the target rotation speed of the generator, control the torque of the motor based on the motor rotation speed and target drive power, control the rotation speed of the generator based on the target rotation speed, and control the torque of the engine based on the engine rotation speed and target engine power.

8. The drive system as defined in claim 7, further comprising;

a sensor which detects the state of charge of the battery, wherein the controller further functions to:

compute a target charge and discharge power of the battery based on the state of charge of the battery, and set a value obtained by adding the target charge and discharge power to the required motor power, as the target generated power.

9. The drive system as defined in claim 7, wherein the controller further functions to:

compute the minimum needed power by subtracting the available discharge power of the battery from a value obtained by adding the reserve drive power to the target engine power.

10. The drive system as defined in claim 7, further comprising:

an auxiliary device, wherein the controller further functions to:

compute a power consumption of the auxiliary device, and correct the target drive power by the power consumption of the auxiliary device.

11. The drive system as defined in claim 7, wherein the controller further functions to:

determine a running mode of the vehicle, and modify the reserve drive power according to the running mode.

12. The drive system as defined in claim 7, wherein the controller further functions to:

determine a gradient of a road, and modify the reserve drive power according to the gradient.

13. A drive system for a vehicle, comprising:

an engine, a drive wheel, a continuously variable transmission provided between the engine and the drive wheel, a motor connected to either one of the engine and drive wheel, a battery electrically connected to the motor, a sensor which detects an accelerator depression amount,
a sensor which detects a vehicle speed,
a sensor which detects an engine rotation speed, and
a controller functioning to:
  compute a target drive power based on the accelerator depression amount and vehicle speed,
  set a target engine power according to the target drive power,
  set a reserve drive power in preparation for an acceleration demand,
  compute a minimum needed power by subtracting an available discharge power of the battery from a value obtained by adding the reserve drive power to the target engine power,
  compute a best fuel cost-performance rotation speed based on the target engine power and the best fuel cost-performance power characteristics of the engine,
  compute a minimum needed rotation speed based on the minimum needed power and the maximum power characteristics of the engine,
  compare the best fuel cost-performance rotation speed and minimum needed rotation speed, and select the larger as the target input rotation speed of the transmission,
  compute the maximum power of the engine based on the engine rotation speed,
  compare the target engine power with the maximum engine power, and select the smaller as a final value of the target engine power,
  control the torque of the motor based on the target drive power and the final value of the target engine power, and
  control the torque of the engine based on the engine rotation speed and the final value of the target engine power.

14. The drive system as defined in claim 13, wherein the controller further functions to:
  set an engine start power which is required to start the engine,
  compute a power required to run only under the motor by adding the engine start power to a value obtained by adding the reserve drive power to the target engine power,
  determine whether or not to prohibit motor running wherein the vehicle runs only under the motor by comparing the available discharge power of the battery with the power required to run only under the motor, and
  set the final value of the target engine power to zero when motor running is permitted.

15. The drive system as defined in claim 13, wherein the controller further functions to:
  set an engine start power which is required to start the engine,
  compute a power required to run only under the motor by adding the engine start power to a value obtained by adding the reserve drive power to the target engine power,
  determine whether or not to prohibit motor running wherein the vehicle runs only under the motor by comparing the available discharge power of the battery with the power required to run only under the motor, and
  start the engine when the engine has stopped, when motor running is prohibited.

16. The drive system as defined in claim 13, further comprising:
  an auxiliary device,
  wherein the controller further functions to:
    compute a power consumption of the auxiliary device, and
    correct the target drive power by the power consumption of the auxiliary device.

17. The drive system as defined in claim 13, wherein the controller further functions to:
  determine a running mode of the vehicle, and
  modify the reserve drive power according to the running mode.

18. The drive system as defined in claim 13, wherein the controller further functions to:
  determine a gradient of a road, and
  modify the reserve drive power according to the gradient.

19. A drive system for a vehicle, comprising:
  an engine,
  a drive wheel,
  a continuously variable transmission provided between the engine and the drive wheel,
  means for detecting an accelerator depression amount,
  means for detecting a vehicle speed,
  means for detecting an engine rotation speed,
  means for computing a target drive power based on the accelerator depression amount and vehicle speed,
  means for setting a reserve drive power in preparation for an acceleration demand,
  means for computing a minimum needed power by adding the reserve drive power to the target drive power,
  means for computing a best fuel cost-performance rotation speed based on the target drive power and best fuel cost-performance power characteristics of the engine,
  means for computing a minimum needed rotation speed based on the minimum needed power and maximum power characteristics of the engine,
  means for comparing the best fuel cost-performance rotation speed and minimum needed rotation speed, and selecting the larger as the target input rotation speed of the transmission,
  means for controlling the speed ratio of the transmission based on the vehicle speed and target input rotation speed, and
  means for controlling the torque of the engine based on the engine rotation speed and target drive power.

20. A drive system for a vehicle, comprising:
  an engine,
  a drive wheel,
  a generator connected to the engine,
  a motor connected to the drive wheel,
  a battery electrically connected to the generator and the motor,
  means for detecting an accelerator depression amount,
  means for detecting a vehicle speed,
  means for detecting an engine rotation speed,
  means for detecting a motor rotation speed,
  means for computing a target drive power based on the accelerator depression amount and vehicle speed,
  means for computing a required motor power by correcting the target drive power by the efficiency of the motor, means for setting a target generated power according to the required motor power, means for computing a target engine power by correcting the target generated power by the efficiency of the generator, means for setting a reserve drive power in preparation for an acceleration demand, means for computing a minimum needed power by adding the reserve drive power to the target engine power, means for computing a best fuel cost-performance rotation speed based on the target engine power and best fuel cost-performance power characteristics of the engine, means for computing a minimum needed rotation speed based on the minimum needed power and maximum power characteristics of the engine, means for comparing the best fuel cost-performance rotation speed and minimum needed rotation speed, and selecting the larger as the target rotation speed of the generator, means for controlling the torque of the motor based on the motor rotation speed and target drive power, means for controlling the rotation speed of the generator based on the target rotation speed, and means for controlling the torque of the engine based on the engine rotation speed and target engine power.

21. A drive system for a vehicle, comprising:

an engine, a drive wheel, a continuously variable transmission provided between the engine and the drive wheel, a motor connected to either one of the engine and drive wheel, a battery electrically connected to the motor, means for detecting an accelerator depression amount, means for detecting a vehicle speed, means for detecting an engine rotation speed, means for computing a target drive power based on the accelerator depression amount and vehicle speed, means for setting a target engine power according to the target drive power, means for setting a reserve drive power in preparation for an acceleration demand, means for computing a minimum needed power by subtracting an available discharge power of the battery from a value obtained by adding the reserve drive power to the target engine power, means for computing a best fuel cost-performance rotation speed based on the target engine power and the best fuel cost-performance power characteristics of the engine, means for computing a minimum needed rotation speed based on the minimum needed power and the maximum power characteristics of the engine, means for comparing the best fuel cost-performance rotation speed and minimum needed rotation speed, and select the larger as the target input rotation speed of the transmission, means for computing the maximum power of the engine based on the engine rotation speed, means for comparing the target engine power with the maximum engine power, and selecting the smaller as a final value of the target engine power, means for controlling the torque of the motor based on the target drive power and the final value of the target engine power, and means for controlling the torque of the engine based on the engine rotation speed and the final value of the target engine power.

22. A vehicle control method used for a vehicle including an engine, a drive wheel and a continuously variable transmission provided between the engine and the drive wheel, the method comprising:

computing a target drive power based on an accelerator depression amount and vehicle speed, setting a reserve drive power in preparation for an acceleration demand, computing a minimum needed power by adding the reserve drive power to the target drive power, computing a best fuel cost-performance rotation speed based on the target drive power and best fuel cost-performance power characteristics of the engine, computing a minimum needed rotation speed based on the minimum needed power and maximum power characteristics of the engine, comparing the best fuel cost-performance rotation speed and minimum needed rotation speed, and selecting the larger as the target input rotation speed of the transmission, controlling the speed ratio of the transmission based on the vehicle speed and target input rotation speed, and controlling the torque of the engine based on an engine rotation speed and target drive power.

23. A vehicle control method used for a vehicle including an engine, a drive wheel, a generator connected to the engine, a motor connected to the drive wheel and a battery electrically connected to the generator and the motor, the method comprising:

computing a target drive power based on an accelerator depression amount and vehicle speed, computing a required motor power by correcting the target drive power by the efficiency of the motor, setting a target generated power according to the required motor power, computing a target engine power by correcting the target generated power by the efficiency of the generator, setting a reserve drive power in preparation for an acceleration demand, computing a minimum needed power by adding the reserve drive power to the target engine power, computing a best fuel cost-performance rotation speed based on the target engine power and best fuel cost-performance power characteristics of the engine, computing a minimum needed rotation speed based on the minimum needed power and maximum power characteristics of the engine, comparing the best fuel cost-performance rotation speed and minimum needed rotation speed, and selecting the larger as the target rotation speed of the generator, controlling the torque of the motor based on a motor rotation speed and target drive power, controlling the rotation speed of the generator based on the target rotation speed, and controlling the torque of the engine based on an engine rotation speed and target engine power.

24. A vehicle control method used for a vehicle including an engine, a drive wheel, a continuously variable transmission provided between the engine and the drive wheel, a motor connected to either one of the engine and drive wheel and a battery electrically connected to the motor, the method comprising:

computing a target drive power based on an accelerator depression amount and vehicle speed, setting a target engine power according to the target drive power, setting a reserve drive power for vehicle acceleration in preparation for an acceleration demand, computing a minimum needed power by subtracting an available discharge power of the battery from a value obtained by adding the reserve drive power to the target engine power, computing a best fuel cost-performance rotation speed based on the target engine power and the best fuel cost-performance power characteristics of the engine, computing a minimum needed rotation speed based on the minimum needed power and the maximum power characteristics of the engine, comparing the best fuel cost-performance rotation speed and minimum needed rotation speed, and select the larger as the target input rotation speed of the transmission, computing the maximum power of the engine based on an engine rotation speed, comparing the target engine power with the maximum engine power, and selecting the smaller as a final value of the target engine power, controlling the torque of the motor based on the target drive power and the final value of the target engine power, and controlling the torque of the engine based on the engine rotation speed and the final value of the target engine power.

* * * * *